Patented July 4, 1939

2,165,140

UNITED STATES PATENT OFFICE 2,165,140

COMPOSITIONS OF MATTER AND METHODS AND STEPS OF MAKING AND USING THE SAME

Mortimer T. Harvey, East Orange, N. J., assignor to The Harvel Corporation, a corporation of New Jersey No Drawing. Application October 25, 1935, Serial No. 46,743

28 Claims. (Cl. 260—23)

The present invention relates generally to friction elements for use in connection with motive bodies and parts and the present invention relates more particularly to friction elements in which cashew nut shell liquid is used.

I find that cashew nut shell liquid which has been modified to a dry state has unusual and desirable frictional characteristics. Other advantages inherent in cashew nut shell liquid modified to the dry state are good thermal conductivity, infusibility and resistance to high temperatures and to rapid and frequent changes in temperature over wide ranges and maintenance of its desirable frictional characteristics at high temperatures and under rapid and under extreme changes of temperature. In addition, cashew nut shell liquid modified to the dry state resists moisture, solvents, oils, grease and so on and for this reason has an added advantage as or in a friction element for machinery and other mechanical use. The modification of cashew nut shell liquid to the dry state can be carried on in various ways among which are polymerization, condensation, the use of driers, the use of vulcanizers and combinations of these methods. Also the cashew nut shell liquid product can be used in conjunction with other materials and products. Illustrative examples of some methods of treating cashew nut shell liquid and of products thereof, with and without the use of other materials, are given in my patents, numbers 1,725,791 to 1,725,797, inclusive, issued August 27, 1929; 1,771,785 and 1,771,786, issued July 29, 1930; 1,819,416, issued August 18, 1931; 1,838,071 to 1,838,077, issued December 22, 1931; 1,921,292 and 1,921,293, issued August 8, 1933; and others intermediate to and subsequent to these, to which reference is hereby made for the purposes of the disclosure of the practice of the present invention.

Among friction elements for which the products of the present invention are suitable the following are given as illustrative examples: grinding wheels, polishing bands and other elements used for abrading by frictional contact, and brakes, clutches, belting, pulley facings, tire treads and other elements for the transmission, regulation, retarding, stopping and other control of mechanical movement by means of frictional engagement. In each case the characteristics of heat resistance, heat conductivity, non-softening under heat and resistance to water, oil and chemicals and especially uniformity of frictional characteristics over a wide range of temperature make the various products of cashew nut shell liquid suitable for use in friction elements. Also, the characteristic which polymerized cashew nut shell liquid has of miscibility with rubber, phenolic resins, and other resins natural and artificial, pitches, gums and drying oils is advantageous in making up friction elements of various kinds and for various uses. And the reactions of polymerized cashew nut shell liquid with driers and with condensation materials, for example those having a methylene group such as formaldehyde and paraform, are advantageous for the handling and preparation of the intermediate and final products.

Examples of oils suitable for use with cashew nut shell liquid in the practice of the present invention are raw and polymerized China-wood oil and linseed oil disclosed in the above mentioned Patents Nos. 1,838,074, 1,838,076 and 1,838,077; and fish oil disclosed in said above mentioned Patent No. 1,838,077.

Cashew nut shell liquid can be modified to a dry and infusible state in which it can be made in various degrees of hardness and can be made to be inflexible or flexible and also in various stages or states intermediate to the flexible and inflexible, that is, in various degrees of flexibility and in various degrees of stiffness. Also, the modified cashew nut shell liquid can be used in mixtures with other materials to secure desired states of flexibility and in various degrees of other characteristics such as toughness, hardness and so on. From the examples of materials given in the patents cited above and from the particular examples given below it can be seen that modifications of cashew nut shell liquid and mixtures of other materials with modifications of cashew nut shell liquid can be in various kinds to suit the characteristics, degrees of characteristics and combinations thereof desired for various frictional purposes and conditions of use. The materials of the present invention are of particular use as or in friction elements because of their unusual friction characteristics including uniformity of friction characteristics from normal to high temperature, for example, to 700° F. and more, their resistance to and infusibility under heat, their heat conductivity, their resistance to wear by abrasion, and resistance to moisture, greases, oils and solvents.

Methods of modifying cashew nut shell liquid to various intermediate states and to the dry and infusible state in which it is suitable for incorporating into compositions and elements for the purposes of the present invention are set forth in the above identified patents and in pending applications and include the polymerization of cashew nut shell liquid with heat or by means of polymerizing chemicals such as about one to ten per cent of acid dehydrating agents such as sulphuric acid, zinc chloride, aluminum chloride, etc., or by means of heat and such an agent. This polymerization can be controlled by varying the amount of polymerizing chemical used or the temperature and duration of heating to get various states ranging from a liquid state to a rubbery state. The heating of cashew nut shell liquid with the addition of driers such as litharge, manganese resinate, copper oleate and so on is another example of producing a dry, infusible product of cashew nut shell liquid. The modifying of the cashew nut shell liquid to a dry, infusible state can be produced by condensation with an aldehyde such for example as formaldehyde, furfuraldehyde, paraformaldehyde, hexamethylenetetramine and so on. Other materials can be used with the modified cashew nut shell liquid and can be added before or after the modification process and also can be produced simultaneously with the modification such for example as in the case of producing a phenol-formaldehyde reaction product simultaneously with the production of a cashew nut shell liquid formaldehyde reaction product such as is disclosed in Patent Number 1,725,797. Drying oils, natural and artificial resins, gums, pitches, waxes, rubber, the polyhydric alcohol-polybasic acid type of resins, cellulose esters, sulphur, and so on can also be used with the modified cashew nut shell liquid or to produce the modification of the cashew nut shell liquid with or without the aid of heat, and with or without increase or decrease in pressure. Also ethers, esters, hydrogenation products, and so on of cashew nut shell liquid can be used. Another form of modified cashew nut shell liquid suitable for the purposes of the present invention is produced from the decarboxylated product called cardanol which can be obtained by distilling cashew nut shell liquid preferably at a low pressure (about 10 millimeters of mercury) or by distilling with steam to remove the carbon and oxygen atoms of the carboxyl group of the anacardic acid ingredient of the cashew nut shell liquid and to separate other ingredients. Cardanol can be modified to the dry, infusible state in a number of ways such as those described above for cashew nut shell liquid itself. Further, numerous combinations of the methods disclosed and referred to above can be used to modify cashew nut shell liquid and derivatives thereof to a dry, infusible state to produce various materials suitable for the various purposes of the present invention and to suit the various conditions under which friction elements are used.

Generally, the materials above disclosed as suitable for the purposes of the present invention can be used in place of all or part of certain materials such as rubber and resins and other materials heretofore used for grinding wheels and other abrasive elements, brake bands and blocks, clutch facings, wheel treads and other friction elements and are usable with abrasive materials, fillers, friction materials, lubricating materials and so on such as silica, alumina, carborundum, the oxides of iron, lead, zinc and so on, marble and slate dust, metal particles, woven fabrics of textiles, asbestos, metals and so on, carbon, graphite, sulphur and other materials according to general practice.

A particular example of a material suitable for incorporation in a brake band is as follows:

I. Two parts by weight of cashew nut shell liquid which has been polymerized to a thick liquid, two parts of rubber, two parts of sulphur, twenty parts litharge, eight parts of barium sulphate (barytes), one part of China-wood oil and two parts of zinc oxide. These materials were thoroughly mixed together on a rubber mill, sheeted to a suitable thickness, pressed into a band fabricated of metal and asbestos filaments and cured in a mold at about forty pounds steam pressure until set.

II. Formula I is followed except that it is modified by first mixing the polymerized cashew nut shell liquid and the rubber as on rubber mixing rolls together with about 8% of the weight of the polymerized cashew nut shell liquid in hexamethylenetetramine after which the other ingredients are mixed in.

The polymerized cashew nut shell liquid of Examples I and II, among others of the examples thereof given above, can be one made by heating cashew nut shell liquid with about five per cent of its weight of concentrated sulphuric acid, the latter being added with about fifteen parts of water, with rapid stirring to disperse the sulphuric acid thoroughly and quickly throughout the cashew nut shell liquid. The heating of this mixture is carried to about 300° to 350° F. (up to this point this material is identified as Example A). To get material of rubber consistency the material of Example A is poured while hot into shallow pans and cured at about 260° to 285° F. for about twenty hours to form a rubber-like product (Example B). In making the products of Examples I and II, the cashew nut shell liquid material of Example A can be mixed in the formula and cured with the material of the formula at the stated or other curing temperature and time or without further curing, to suit the conditions under which it is to be used and to suit the effects of the other ingredients of the formula on the treated cashew nut shell liquid.

Cashew nut shell liquid polymerized to a rubber-like consistency by a method similar to that given above with both the heating and curing steps and sold to the trade under the trade-mark name "Cardolite" is suitable for use in Examples I and II above.

*Example III.*—Equal parts by weight of a cresol and cashew nut shell liquid are reacted together with a molecular equivalent of formaldehyde to get a resin of syrupy consistency from which water is removed. Into this resin is mixed an equal part by weight of the material of Example A heat being used to facilitate the mixing. Brake bands can be made by dipping bands of woven cotton, asbestos or other fabric in the material of Example III preferably heated, for example at about 220° F., and with the aid of a solvent such as solvent naphtha (to about 50% solids). After thorough impregnation and draining the material is first heated to remove the solvent and is then cured at about 250° to 300° F. for about four or five hours. The impregnated band can be finished off and riveted or otherwise fastened to a metal band support to form a brake band.

The material of Example B can be mixed with rubber and filler such as asbestos fiber, lead and copper wire and other ingredients to form a molded brake block and cured at about 325° F. for about 14 to 20 hours. The solvent can also be used to increase the plasticity in which case a preliminary curing is used in the mold at about 175° F. to remove the solvent after which it is further cured at about 325° F. The material is suitable for extrusion to approximate shape before putting into the mold.

*Example IV.*—The material of Example A is mixed with about six to eight per cent of its weight in paraformaldehyde or hexamethylene tetramine and cured at 260° F. to 300° F. to a hard state after which it is ground to a dust. This material can be milled in with rubber to replace a part of the latter or as an addition thereto to increase the heat conductivity and to enhance the frictional characteristics. This material is known on the market under the trade-mark name of "Cardolite dust" and is used in place of carbon black to increase the heat conductivity of rubber and it has the additional advantage of having unusually good frictional characteristics whereas carbon black and other carbonaceous material reduce the friction of rubber and other mixtures.

*Example V.*—To one hundred parts by weight of cashew nut shell liquid, which had been brought up to 600° F. and then allowed to cool at room temperature, about eight parts of hexamethylene tetramine was mixed in. This as a binder was mixed in the proportion of about three parts by weight with about one hundred parts of carborundum particles and pressed in a grinding wheel mold. The wheel was cured in the mold at about 175° F. for about twelve hours, removed from the mold and cured further at about 285° F. for about twenty-four hours. The cured wheel was hard and strong and had good heat conductivity.

*Example VI.*—Material for use as a skim coat on belting and which can be applied thereto by calendar rolls is made up as follows, in parts by weight: fifty parts of rubber, fifty parts of Cardolite, three parts of litharge, fifteen parts of "Gastex", a finely divided carbon, five pounds of sulphur and one-half part of triethanolamine. A mixture is made of these ingredients on a rubber mill.

Subject matter disclosed herein but not claimed, is claimed in my copending application Serial No. 273,415, filed May 13, 1939.

Having described my present invention, what I claim and desire to protect by Letters Patent is:

1. A friction element containing friction materials, and a bond for the friction materials comprising the reaction product of cashew nut shell liquid and formaldehyde, the bond being formed in situ in the element to be uniformly distributed throughout the friction materials to produce homogeneity in the element and insure uniform functioning of the element as it wears away in service.

2. A friction element containing friction materials, and a bond for the friction materials comprising the reaction product of cashew nut shell liquid and hexamethylenetetramine, the bond being formed in situ in the element to be uniformly distributed throughout the friction materials to produce homogeneity in the element and insure uniform functioning of the element as it wears away in service.

3. A friction element containing friction materials, and a bond for the friction materials comprising cashew nut shell liquid blended with a polymerizing fatty oil and cured in situ by polymerization.

4. The method of bonding friction materials for a composition friction element which consists in mixing with the materials cashew nut shell liquid and a substance selected from the group consisting of formaldehyde, furfuraldehyde, paraformaldehyde, and hexamethylenetetramine, and subjecting the mixture to heat to form a resin in situ.

5. The method of bonding friction materials for a composition friction element which consists in heat treating cashew nut shell liquid to produce a drying liquid, mixing with the materials the drying liquid and a substance selected from the group consisting of formaldehyde, furfuraldehyde, paraformaldehyde, and hexamethylenetetramine, and subjecting the mixture to heat to form a resin in situ.

6. A friction element containing friction materials, and a bond for the friction materials comprising the reaction product of cashew nut shell liquid and a substance selected from the group consisting of formaldehyde, furfuraldehyde, paraformaldehyde, and hexamethylenetetramine, the bond being formed in situ in the element to be uniformly distributed throughout the friction materials to produce homogeneity in the element and insure uniform functioning of the element as it wears away in service.

7. The method of making a composition friction element which consists in dissolving cashew nut shell liquid in a solvent to promote the distribution of the cashew nut shell liquid throughout the friction materials, intermixing the friction materials, solvent and cashew nut shell liquid, and a substance selected from the group consisting of formaldehyde, furfuraldehyde, paraformaldehyde and hexamethylenetetramine, and in then subjecting the mixture to heat to eliminate the solvent and form a resin in situ to bond the friction materials.

8. A friction element selected from the group consisting of brake and clutch facings and containing friction materials, and a bond for the friction materials comprising cashew nut shell liquid blended with raw China-wood oil and cured in situ by polymerization.

9. A friction element selected from the group consisting of brake and clutch facings and containing friction materials, and a bond for the friction materials comprising cashew nut shell liquid blended with heat-treated China-wood oil and cured in situ.

10. A friction element selected from the group consisting of brake and clutch facings and containing friction materials, and a bond for the friction materials comprising cashew nut shell liquid blended with fish oil and cured in situ and resistant to high temperatures and pressures to which the element is subjected in use.

11. The method of bonding friction materials in a composition friction element which consists in blending cashew nut shell liquid with a sufficient quantity of a substance selected from the group consisting of polymerizing and drying fatty oils to adjust the characteristics of a bond afforded by the blended cashew nut shell liquid and said substance to the use to which the element is to be put, mixing the blend with friction materials, and subjecting the mixture to heat to cure the bond.

12. The method of bonding friction materials in a composition friction element and the like which consists in blending cashew nut shell liquid and a substance selected from the group consisting of formaldehyde, furfuraldehyde, paraformaldehyde, and hexamethylenetetramine with a sufficient quantity of a substance selected from the group consisting of polymerizing and drying fatty oils to adjust the characteristics of a bond afforded by the blend to the use to which the friction element is to be put, mixing the blend with friction materials, and subjecting the mixture to heat to cure the bond by reacting the cashew nut shell liquid and the substance selected from the group containing the methylene radical to produce a resin and by polymerizing or drying the blending substance.

13. A friction element selected from the group consisting of brake and clutch facings and containing friction materials, and a bond for the friction materials comprising cashew nut shell liquid which has been modified to a dry state.

14. A friction element selected from the group consisting of brake and clutch facings and comprising a plurality of friction ingredients, one of which is cashew nut shell liquid which has been modified to an infusible, oil resistant dry state.

15. A friction lining for an element selected from the group consisting of brakes and clutches and comprising cashew nut shell liquid which has been modified through chemical reaction to a dry state.

16. A friction element containing friction materials, and a bond for the friction materials comprising a chemical reaction product of cashew nut shell liquid, the bond being formed in situ in the element by said chemical reaction.

17. An element adapted for repeated frictional engagements and selected from the group consisting of brake elements and clutch elements, said element comprising a composition which is cashew nut shell liquid which has been modified to a solid, heat and friction withstanding condition by chemical reaction.

18. A compounded friction element selected from the group consisting of brakes and clutches and comprising, as one of its frictional ingredients, cashew nut shell liquid which has been modified to a dry, hard and pulverulent state.

19. A compounded friction element selected from the group consisting of brakes and clutches and comprising, as one of its frictional ingredients, cashew nut shell liquid which has been modified by chemical action to a dry state.

20. A friction element selected from the group consisting of brake and clutch facings and comprising cashew nut shell liquid which has been modified to a dry state and in which said element said modified cashew nut shell liquid imparts maintenance of uniformity of frictional characteristics at high temperature and under rapid and under extreme changes of temperature.

21. A heat and abrasive resistant element selected from the group consisting of brake linings and clutch facings and comprising cashew nut shell liquid which has been modified to a dry and infusible state and in which said element said modified cashew nut shell liquid imparts maintenance of uniformity of frictional characteristics at high temperature and under rapid and under extreme changes of temperature.

22. A brake element subject to wear by friction which comprises cashew nut shell liquid which has been modified to a dry state and in which said element said modified cashew nut shell liquid imparts maintenance of uniformity of frictional characteristics at high temperature and under rapid and under extreme changes of temperature.

23. An element selected from the group consisting of brakes and clutches adapted for transmission or translation of kinetic energy by frictional contact and comprising cashew nut shell liquid modified by polymerization to a thickened liquid and modified further to a dry state and in which said element said modified cashew nut shell liquid imparts maintenance of uniformity of frictional characteristics at high temperature and under rapid and under extreme changes of temperature.

24. A brake lining impregnated with an infusible, oil resistant resin-like product of cashew nut shell liquid and in which said brake lining said resin-like product of cashew nut shell liquid imparts maintenance of uniformity of frictional characteristics at high temperature and under rapid and under extreme changes of temperature.

25. A friction element selected from the group consisting of brake and clutch facings and comprising polymerized cashew nut shell liquid and in which said element said polymerized cashew nut shell liquid imparts maintenance of uniformity of frictional characteristics at high temperature and under rapid and under extreme changes of temperature.

26. A friction element selected from the group consisting of brake and clutch facings and which comprises cashew nut shell liquid which has been thickened and set to a dry, infusible state and in which said element said modified cashew nut shell liquid imparts maintenance of uniformity of frictional characteristics at high temperature and under rapid and under extreme changes of temperature.

27. A friction element selected from the group consisting of brake linings and clutch facings said element comprising modified cashew nut shell liquid as a friction resistant ingredient said modified cashew nut shell liquid being in a dry, thickened, infusible, heat resistant condition and in which said element said modified cashew nut shell liquid imparts maintenance of uniformity of frictional characteristics at high temperature and under rapid and under extreme changes of temperature.

28. A compounded friction element selected from the group consisting of brake and clutch facings and comprising, as one of its ingredients, cashew nut shell liquid which has been modified to a dry, hard state and pulverized and in which said element said modified cashew nut shell liquid imparts maintenance of uniformity of frictional characteristics at high temperature and under rapid and under extreme changes of temperature.

MORTIMER T. HARVEY.